United States Patent [19]

Knight

[11] Patent Number: 4,981,231

[45] Date of Patent: Jan. 1, 1991

[54] CONTAINER CLOSURE CAPS AND COMPOSITIONS FOR FORMING GASKETS FOR THEM

[75] Inventor: John R. Knight, Bar Hill, England

[73] Assignee: W. R. Grace & Co.-Conn., Lexington, Mass.

[21] Appl. No.: 337,682

[22] Filed: Apr. 13, 1989

[30] Foreign Application Priority Data

Apr. 15, 1988 [GB] United Kingdom ............... 8808890

[51] Int. Cl.$^5$ ............................................. B65D 53/00
[52] U.S. Cl. ..................................... 215/341; 260/876; 264/331.15; 525/222
[58] Field of Search ............... 215/341, 348, 349, 352; 264/268, 331.15, 331.17; 525/222

[56] References Cited

U.S. PATENT DOCUMENTS

| | | | |
|---|---|---|---|
| 3,220,966 | 11/1965 | Flanagan | 260/27 |
| 3,563,402 | 2/1971 | Arnold | 215/341 |
| 3,853,970 | 12/1974 | Dietrich | 264/331.15 X |
| 3,856,889 | 12/1974 | McConnell | 260/897 |
| 3,868,433 | 2/1975 | Bartz et al. | 260/876 |
| 3,937,758 | 2/1976 | Catagna | 260/876 |
| 3,975,463 | 8/1976 | Hirata et al. | 264/331.17 X |
| 4,020,025 | 4/1977 | Zeitler et al. | 525/222 X |
| 4,085,186 | 4/1978 | Rainer | 264/268 |
| 4,132,050 | 1/1979 | Young | 53/463 |
| 4,232,132 | 11/1980 | Grigo et al. | 525/222 |
| 4,361,237 | 11/1982 | Heiremans et al. | 525/222 X |
| 4,439,478 | 3/1984 | Ferguson et al. | 428/137 |
| 4,497,936 | 2/1985 | Tancrede et al. | 525/222 |
| 4,672,091 | 6/1987 | Berta | 525/88 |
| 4,678,834 | 7/1987 | Boivin et al. | 525/222 X |
| 4,684,554 | 8/1987 | Ou-Yang | 215/341 X |
| 4,842,947 | 6/1989 | Jachee et al. | 428/461 |
| 4,846,362 | 7/1989 | Schloss | 215/349 |

FOREIGN PATENT DOCUMENTS

| | | |
|---|---|---|
| 1009098 | 10/1973 | Canada . |
| 0117516 | 2/1984 | European Pat. Off. . |
| 0205914 | 5/1986 | European Pat. Off. . |
| 0219265 | 4/1987 | European Pat. Off. . |
| 1168541 | 1/1967 | United Kingdom . |
| 1112025 | 5/1968 | United Kingdom . |
| 1416357 | 8/1973 | United Kingdom . |
| 1497577 | 6/1975 | United Kingdom . |
| 2029317 | 9/1978 | United Kingdom . |
| 2063278 | 10/1978 | United Kingdom . |
| 2033838 | 8/1979 | United Kingdom . |

OTHER PUBLICATIONS

Japanese Abstract 53127546.
Japenese Patent Abstract 59041342.

*Primary Examiner*—Stephen Marcus
*Assistant Examiner*—Nova Stucker
*Attorney, Agent, or Firm*—John Dana Hubbard; William L. Baker

[57] ABSTRACT

When a gasket of thermoplastic material is moulded in a polypropylene cap, the adhesion of the gasket to the cap at temperatures below 200° C. is improved by including an adhesion-promoting polymer of propylene in the thermoplastic composition.

12 Claims, No Drawings

CONTAINER CLOSURE CAPS AND COMPOSITIONS FOR FORMING GASKETS FOR THEM

Bottles and other containers are often closed with a cap, for instance a crown cap, a roll-on cap or a screw-on cap. In order to improve the seal between the open end of the container and the inner face of the cap it is common to provide a gasket.

The gasket is often formed of a thermoplastic polymeric composition and various ways of forming the gasket and positioning it in the cap are known. Various methods and compositions are described in GB No. 1,112,025. Included amongst the exemplified compositions are mixtures of ethylene propylene copolymer with polyethylene or ethylene vinyl acetate copolymers. In particular there are examples of a mixture of 50 parts low density polyethylene with 50 parts of an ethylene propylene copolymer containing 65% ethylene and of a blend of 50 parts of an ethylene vinyl acetate copolymer having a vinyl acetate content of 32 to 34% with 50 parts of an ethylene propylene copolymer having an ethylene content of 65%. Both these examples demonstrate the formation of discs that could then be inserted into the caps.

It is necessary to hold the gasket in the cap and it is known to achieve this by provision of a suitable adhesive between the gasket and the cap, for instance as described in GB No. 1,112,025. Often, when the cap is metal, the sheet from which the cap is stamped is provided with a lacquer coating that will then serve as the adhesive.

Particular circumstances arise when the gasket is formed by moulding molten thermoplastic polymeric composition in the cap to the required configuration or profile. Such gaskets are formed by depositing the required quantity of molten composition in the cap and then moulding the composition against the inner face of the cap using a mould member, thereby forming a solid gasket having the desired profile. In order to facilitate release of the mould member, it is sometimes desirable to positively cool the mould member.

It is necessary to ensure that the gasket does not fall out of the cap and, when the cap is of metal, lacquer or other adhesive can be used for this purpose, as described above. However when the cap is formed of a propylene polymer it would be necessary to deposit the adhesive or other lacquer individually in the cap prior to applying the molten composition, and this is commercially impracticable. Accordingly it would be desirable for the melt-moulded gasket to bond to the propylene polymer of the cap without any applied adhesive. It is known to provide shaped elements on the inner walls of the skirt of the cap, in order to hold the gasket in position, but it would be desirable to avoid the need for this.

In EPA No. 86307519.8, a process is described in which the cap is pre-heated before the application of the molten composition, so as to promote adhesion of the gasket to the composition. Although this does give some advantages, it is inconvenient to rely upon this as the sole way of achieving adequate adhesion.

It is also known that if the molten composition is applied at a sufficiently elevated temperature, e.g., a temperature above 200° C., improved adhesion may be obtained but these high temperatures can be damaging to the polypropylene caps.

There is therefore a need for an improved thermoplastic polymeric composition that, as a result of moulding at a temperature below 200° C., will provide a gasket that adheres directly to the cap to an extent sufficient to prevent the gasket falling out of the cap.

Various thermoplastic polymeric compositions are, of course, known as adhesives for laminating propylene polymer film, such as in EP No. 0117516 where copolymers of ethylene and an acrylic ester are used. The use of ethylene vinyl acetate as a material that will promote adhesion to various polymers is also well known.

EP-A-205914 describes a composition for sealing containers and which comprises 75 to 95 parts of a defined polyethylene, 15 to 50 parts of a defined filler and 10-20 parts of a material that can be a blend of ethylene vinyl acetate, process oil and an ethylene propylene copolymer as described in EP-A-32804, according to which this copolymer contains 55 to 70% ethylene. It is therefore elastomeric.

The described compositions do not give the low-temperature adhesion and other properties required in the invention, due to the combination of a high ethylene content in the ethylene propylene copolymer and the oil and the rather high amounts of filler that are frequently used.

A thermoplastic composition according to the present invention is suitable for moulding within a polypropylene cap to form a gasket in the cap, is substantially free of gasket-releasing material, and contains an adhesion-promoting polymer of propylene that has a melting point below 160° C. and that is present in an amount that is below 60%, by weight of the thermoplastic composition, and that is such that a gasket moulded in a polypropylene cap at a temperature below 200° C. adheres directly to the cap.

The invention also includes the resultant caps. Thus a polypropylene cap according to the invention has a gasket that has been moulded at a temperature below 200° C. within the cap from a thermoplastic composition and that adheres directly to the cap and that is formed from a thermoplastic composition that is substantially free of gasket-releasing material and contains an adhesion-promoting polymer of propylene that has melting point below 160° C. and that is present in an amount that is below 60% by weight of the thermoplastic composition.

The invention also includes processes for making such caps by forming a gasket of thermoplastic composition within a polypropylene cap by melt extruding the composition into the cap and moulding the composition within the cap at a temperature below 200° C. to form a gasket that adheres directly to the cap, and in this method the composition is substantially free of gasket-releasing material and contains an adhesion-promoting polymer of propylene that has a melting point below 160° C. and that is present in an amount that is below 60% by weight of the thermoplastic composition.

There must be an adhesion-promoting propylene polymer and thus there is no value in incorporating, as the propylene polymer, a polymer that does not improve adhesion at the specified low temperatures. For instance, high melting propylene polymers are generally unsuitable and the melting point of the polymer should be below 160° C., generally below 155° C. and preferably below 150° C.

If the melting point is too low then the properties of the gasket may be adversely affected and so generally the melting point is above 100° C., most preferably above 125° C. Best results are generally obtained when the melting point is in the range about 130 to about 140 or 145° C., typically around 135° C.

Although the inclusion in the composition of materials that conventionally might be expected to improve adhesion, for instance ethylene vinyl acetate adhesives, is found not to result in useful adhesion of the gasket direct to the polypropylene of the cap, we have surprisingly found that the incorporation of appropriate polymers of propylene in the thermoplastic composition can easily result in adequate adhesion of the gasket directly to the polypropylene cap at appropriately low temperatures, i.e., in the absence of any intervening lacquer or other adhesive layer.

The polymer can be acid-modified by incorporation of a small amount of carboxylic groups in known manner, e.g., by incorporation of maleic anhydride or an acrylic monomer. This can give improved adhesion to the cap, especially when the moulding temperature is up to 155° C. or 160° C.

The polymer of propylene that is included in the thermoplastic composition can be a substantial homopolymer, i.e., its groups are substantially all derived from propylene although small amounts of other groups, e.g., carboxylic groups, may be present. However it can sometimes advantageously be a copolymer of propylene with a minor amount of ethylene. Preferably it is a statistical or random copolymer but it may be a terpolymer. The copolymer may be acid modified. The amount of ethylene is generally in the range 0.5 to 20%, most preferably 1 to 10%, by weight of the copolymer, and should be sufficiently low that the copolymer is substantially non elastomeric. The amount of ethylene in the copolymer, based on the total weight of thermoplastic composition, is generally in the range 0.2 to 5% by weight.

In order that the composition has other properties suitable for use as a gasket it is generally necessary that the amount of the propylene polymer should be not more than about 60% of the total thermoplastic polymeric composition and preferably it is not more than about 50%. If the amount is too low then the propylene polymer may be incapable of giving adequate bonding to the gasket and so generally the amount is at least 5%. For most purposes amounts in the range 10 to 30% are suitable although with some particular compositions higher or lower amounts are suitable.

The remainder of the thermoplastic composition generally comprises one or more elastomeric materials such as styrene-butadiene-styrene copolymers, styrene-ethylene-butylene-styrene copolymers, polyamides, ethylene vinyl alcohol copolymers, polyethylenes, ethylene vinyl acetate copolymers or blends thereof. The elastomeric material can also comprise an elastomeric copolymer of propylene with sufficient ethylene to render the copolymer elastomeric, usually above 50% of the copolymer. Generally however the amount of elastomeric copolymer of propylene is below 50% of the total elastomeric content and generally below 50%, often below 30% of the total composition. Usually it is absent. Other polymers may also be present in minor amounts. For example the composition may consist substantially entirely of a blend of the non-elastomeric propylene polymer with polyethylene or it may consist substantially entirely of a blend of the non-elastomeric propylene polymer with ethylene vinyl acetate or with a mixture of ethylene vinyl acetate and polyethylene.

The polyethylene, if used, is preferably a linear low density polyethylene or a very low density polyethylene. Ethylene vinyl acetate copolymer if used preferably has melt index in the range about 3 to about 15, most preferably about 5 to about 10, and generally contains about 8 to about 35%, most preferably about 10 to about 28%, often about 10 to about 20%, vinyl acetate.

The composition may contain filler, slip aids, conventional additives in conventional amounts, usually below 10% and most preferably below 3% based on the total weight of the composition, the remainder of the composition being thermoplastic polymeric material. The presence of filler offers no advantage and is generally undesirable.

Although the composition can contain slip aids and other release materials in quantities suitable for promoting slip of the gasket on the container, the composition must naturally be substantially free of gasket-releasing material. Thus if the composition does contain anything that might serve to reduce the adhesion between the cap and the gasket and thus to release the gasket from the cap, this material must be present in an amount below whatever amount will give a releasing effect. In particular, the composition is preferably substantially free of oil since the presence of oil will usually tend to promote displacement of the gasket. However some white oil, e.g. up to 10% or even 20% of the total composition can be useful as a softener in some compositions for instance, when containing an ethylene-propylene elastomer. Its tendency to reduce adhesion can be overcome by selection of appropriate other elastomers (preferably styrene-butadiene-styrene) and the use of a sufficient amount of the non-elastomeric propylene polymer.

The composition may be made by blending the components in conventional manner, generally to form a homogeneous blend of them that can be solidified and, prior to use, supplied to a melt extruder. Alternatively the composition can be extruded as a melt directly after blending.

The composition is generally inserted into the caps by extrusion of molten composition into the caps, using cutting or other means in known manner for depositing the required amount of molten composition into each cap. Generally the cap is at ambient temperatures at the time the molten composition is inserted but it may have been preheated as described in EPA No. 86307519.8. The temperature of the composition, at the time it is inserted into the cap, should be below 200° C. and will be selected so as to give adequate bonding of the gasket direct to the cap. Preferably it is below 190° C. Generally it needs to be above 140° C. and typical moulding temperatures are generally in the range 150 to 180° C. The molten composition is then moulded to the desired configuration in the cap by an appropriate mould member. This mould member is generally cold.

Although the propylene polymer of the cap can be a polymer of propylene with significant amounts of a comonomer, for instance ethylene, preferably the cap is formed of polypropylene.

The polypropylene caps into which the discs or pellets are moulded may be crown caps or, preferably, screw caps and may be of conventional diameter, often in the range 20 to 40 mm; although the diameter can be greater, for instance 100 mm. The gasket generally has a diameter substantially the same as the internal diameter of the cap. Since the gasket bonds to the cap it is unnecessary to profile the cap in such a way as to assist retention of the gasket in the cap, although this can be done if desired. The cap can include a pilfer-proof or tamper-evident feature.

The invention is now illustrated by the following examples. In these, Examples 2, 4, 5, 8, 9, 11, 13 and 14 are of the invention, and the remainder are comparative.

EXAMPLES 1–12

A range of thermoplastic polymeric compositions were formed of 100 parts thermoplastic polymeric material and between 0.6 and 1.6 parts conventional additives such as filler, pigment, anti-oxidant and slip aid (0.5 parts fatty amide). Each composition was melt extruded into polypropylene caps and moulded to the desired gasket shape. The process was repeated at different temperature to establish the bond temperature, i.e., the lowest temperature at which satisfactory bonding occurred. The compositions, and the bond temperatures, are shown in the following table.

| Example | 1 | 2 | 3 | 4 | 5 | 6 | 7 | 8 | 9 | 10 | 11 | 12 |
|---|---|---|---|---|---|---|---|---|---|---|---|---|
| EVA 1 | 100 | 80 | 80 | 80 | 80 | 80 | 95 | 70 | 50 | 90 | — | — |
| EP 1 | — | 20 | — | 20 | — | — | 5 | 30 | 50 | 10 | 10 | — |
| EP 2 | — | — | — | — | 20 | — | — | — | — | — | — | — |
| EVA 2 | — | — | 20 | — | — | — | — | — | — | — | — | — |
| EVA 3 | — | — | — | — | — | 20 | — | — | — | — | — | — |
| LLDPE | — | — | — | — | — | — | — | — | — | — | 90 | 100 |
| Bond Temp °C. | >200 | 190 | >200 | 180 | 190 | >200 | >200 | 165 | 165 | 200 | 172 | 200 |

EVA 1 is an ethylene vinyl acetate copolymer having a melt index of 8 and containing 14% vinyl acetate, as sold under the trade name Elvax 550.

EP 1 is a substantially non-elastomeric ethylene propylene copolymer containing 4% ethylene and having a melting point of 136° C. as sold by Solvay under the trade name Eltex PKS 400.

EP 2 is a substantially non-elastomeric ethylene propylene terpolymer having a melting point of 136° C. as sold by Himont under the trade name Moplen EPC 3C 37F.

EVA 2 is an EVA terpolymer as sold by Dupont under the trade name Bynel CXA 3101.

EVA 3 is a modified EVA copolymer as sold by Chemplex under the trade name Plexar 3.

LLDPE is a linear low density polyethylene.

Elvax, Eltex, Moplen, Bynel and Plexar are trade names.

The benefit of including EP 1 or EP 2 is clearly apparent from the examples of the invention, namely examples 2, 4, 5, 8, 9 and 11.

The failure of EVA 2 and EVA 3 is surprising since both materials are sold as materials that will promote adhesion. For instance Bynel CXA 3101 is specifically advertised for adhesion to polypropylene in coextrusion with polyethylene or with ethylene vinyl acetate, but as is apparent from the results it gives bonding greatly inferior to that obtainable with the ethylene propylene resins.

EXAMPLE 13–16

The process of the preceding examples was repeated but using the following polymer blends and about 1.5 parts additives such as slip aid, filler, pigment and anti-oxidant.

| Example | 13 | 14 | 15 | 16 |
|---|---|---|---|---|
| EVA 4 | 80 | 80 | 80 | 90 |
| CP 1 | 20 | — | — | — |
| CP 2 | — | 20 | — | — |
| CP 3 | — | — | — | — |
| Bond temperature (°C.) | 190° C. | 190° C. | 210° C. | >200° C. |

EVA 4 is an ethylene vinyl acetate copolymer containing 14% vinyl acetate and having melt index 7 dg/min (2.16 Kg, 190° C.) as sold under the trade name Escorene Ultra UL00714 by Exxon.

CP 1 is carboxylated propylene copolymer having melting point 153° C. as sold under the trade name Modic P 310 K by Mitsubishi Petrochemical.

CP 2 is carboxylated propylene copolymer having melting point 132° C. as sold under the trade name Modic P310K by Mitsubishi Petrochemical.

CP 3 is carboxylated polypropylene having melting point 165° C. as sold under the trade name Admer QF 500 by Mitsui Petrochemical.

This demonstrates the need to use a propylene polymer having a relatively low melting point.

While the present invention has been described with reference to its preferred embodiments, other embodiments can achieve the same result. Variations and modifications of the present invention will be obvious to those skilled in the art and it is intended to cover in the appended claims all such modifications and equivalents as fall within the true spirit and scope of this invention.

I claim:

1. A thermoplastic composition suitable for forming a gasket within a polypropylene cap comprising a thermoplastic composition containing up to 60% by weight of the composition of an adhesion-promoting polymer of propylene selected from the group consisting of substantial homopolymers of propylene and copolymers of propylene with up to 40% by weight of the copolymer being ethylene or another alpha olefin, the polymer of propylene having a melting point of below 106° C., said composition being substantially free of gasket-releasing material and being capable of forming a gasket that directly adheres to the cap by moulding at a temperature below 200° C.

2. The composition according to claim 1 wherein the polymer of propylene is substantially non-elastomeric and is a copolymer of propylene with up to 20% ethylene or other alpha olefin.

3. The composition according to claim 1 wherein the polymer of propylene is a copolymer of propylene with 1 to 10% ethylene.

4. The composition according to claim 1 wherein the polymer of propylene is an acid modified propylene homopolymer.

5. The composition according to claim 1 wherein the polymer of propylene has a melting point of 125° to 155° C.

6. The composition according to claim 1 wherein the amount of polymer of propylene in the composition is from 10 to 30% by weight.

7. The composition according to claim 1 wherein the thermoplastic composition is formed of a blend of (a) the polymer of propylene; with (b) other thermoplastic polymeric materials selected from the group consisting of styrene-butadiene-styrene copolymers, styrene-ethylene-butylene-styrene copolymers, polyamides, ethylene vinyl alcohol copolymers, polyethylene, ethylene vinyl acetate copolymers and blends thereof.

8. The composition according to claim 7 wherein the polyethylene is selected from linear low density polyethylene and very low density polyethylene and the ethylene vinyl acetate is selected from copolymers having a melt index of 3 to 15 and containing 8 to 35% vinyl acetate.

9. A polypropylene cap having a gasket that has been moulded at a temperature below 200° C. within the cap comprising a thermoplastic polymeric composition adhered directly to the polypropylene cap and is formed from a thermoplastic composition that is substantially free of gasket-releasing material and is formed from a blend up to 60% by weight of the thermoplastic composition of an adhesion-promoting polymer of propylene selected from the group consisting of propylene homopolymers and copolymers of propylene with up to 20% of an alpha olefin; and at least 40% by weight of the thermoplastic composition being a polymeric material selected from the group consisting of styrene-butadiene-styrene copolymers, styrene-ethylene-butylene-styrene copolymers, polyamides, ethylene vinyl alcohol copolymers, polyethylenes, ethylene vinyl acetate copolymers and blends thereof.

10. A process in which a gasket of thermoplastic composition is formed within a polypropylene cap by melt extruding the thermoplastic composition into the cap and moulding the composition within the cap to form the gasket, comprising moulding at a temperature below 200° C. and directly adhering the gasket to the polypropylene cap, which gasket is formed from a thermoplastic composition that is substantially free of gasket-releasing material and that contains an adhesion-promoting polymer of propylene selected from the group consisting of homopolymers of propylene and copolymers of propylene wherein the other monomer is less 40% by weight of the copolymer, the polymer of propylene has a melting point below 160° C. and is present in an amount that is below 60% by weight of thermoplastic composition.

11. The process according to claim 10 wherein the moulding is conducted at a temperature of 140° to 190° C.

12. The process according to claim 10 wherein the thermoplastic composition is a blend of up to 60% by weight of the thermoplastic composition of an adhesion-promoting polymer of propylene and at least 40% by weight of the composition of one or more thermoplastic polymers selected from the group consisting of styrene-butadiene-styrene copolymers, styrene-ethylene-butylene-styrene copolymers, polyamides, ethylene vinyl alcohol copolymers, polyethylenes, ethylene vinyl acetates and blends thereof.

* * * * *

UNITED STATES PATENT AND TRADEMARK OFFICE
CERTIFICATE OF CORRECTION

PATENT NO. : 4,981,231

DATED : January 1, 1991

INVENTOR(S) : John Richard Knight

It is certified that error appears in the above-identified patent and that said Letters Patent is hereby corrected as shown below:

Column 6, claim 1, line 54, delete "106" and substitute --160--.

Signed and Sealed this

Nineteenth Day of May, 1992

Attest:

DOUGLAS B. COMER

*Attesting Officer*  Acting Commissioner of Patents and Trademarks